United States Patent [19]
Jensen et al.

[11] Patent Number: 5,538,589
[45] Date of Patent: Jul. 23, 1996

[54] COMPOSITE STRINGER ASSEMBLY MACHINE

[75] Inventors: Donald A. Jensen, Kent, Wash.; Joel L. Morphis, Pal Myra, Ind.; Joel M. Thomas, Kent, Wash.

[73] Assignee: The Boeing Company, Seattle, Wash.

[21] Appl. No.: 299,925

[22] Filed: Aug. 31, 1994

[51] Int. Cl.⁶ ................................................. B30B 5/02
[52] U.S. Cl. .................. 156/581; 156/583.3; 156/583.8; 156/583.91; 100/211; 100/233
[58] Field of Search ..................... 156/443, 580, 156/581, 583.1, 583.3, 583.8, 583.91; 100/93 P, 211, 233

[56] References Cited

U.S. PATENT DOCUMENTS

| | | | |
|---|---|---|---|
| 2,337,250 | 12/1943 | Klassen | 156/583.8 |
| 3,319,804 | 5/1967 | Beatty et al. | 214/1 |
| 3,780,882 | 12/1973 | Wagner | 214/1 |
| 4,141,775 | 2/1979 | Williams et al. | 156/358 |
| 4,475,976 | 10/1984 | Mittelstadt et al. | 156/286 |
| 4,744,741 | 5/1988 | Glover et al. | 425/123 |
| 4,980,013 | 12/1990 | Lowery | 156/443 |
| 5,096,525 | 3/1992 | Engwall | 156/196 |
| 5,139,604 | 8/1992 | Mitchell | 156/479 |

Primary Examiner—David A. Simmons
Assistant Examiner—J. Sells
Attorney, Agent, or Firm—Christensen, O'Connor, Johnson & Kindness

[57] ABSTRACT

A machine (34) for use in assembling a stringer (32) from two C-shaped charges (22), each channel charge being draped about a mandrel (20), is disclosed. The machine includes a framework (36) having a first platform (40) for supporting the mandrels and C-shaped charges such that the C-shaped charges are back to back. A U-shaped anvil (48), connected to the framework, is rotatable between an engaged position overlying the mandrels and the C-shaped charges, and a disengaged position away from the mandrels and C-shaped charges. The anvil (48) includes a side bladder (58) for compacting the C-shaped charges against one another by pressing the mandrels and C-shaped charges together and against a wall of the anvil opposite to the side bladder, and a top bladder (62) for aligning the mandrels and C-shaped charges by compressing the mandrels and C-shaped charges against the platform. The machine further includes a rotation mechanism for moving the mandrels and C-shaped charges from the first platform to a second platform and rotating the mandrels and C-shaped charges through 180 degrees as they are moved to invert the mandrels and the C-shaped charges draped over the mandrels. Also included with the machine are alignment devices (42) for aligning the ends of the mandrels and the C-shaped charges with one another.

12 Claims, 15 Drawing Sheets

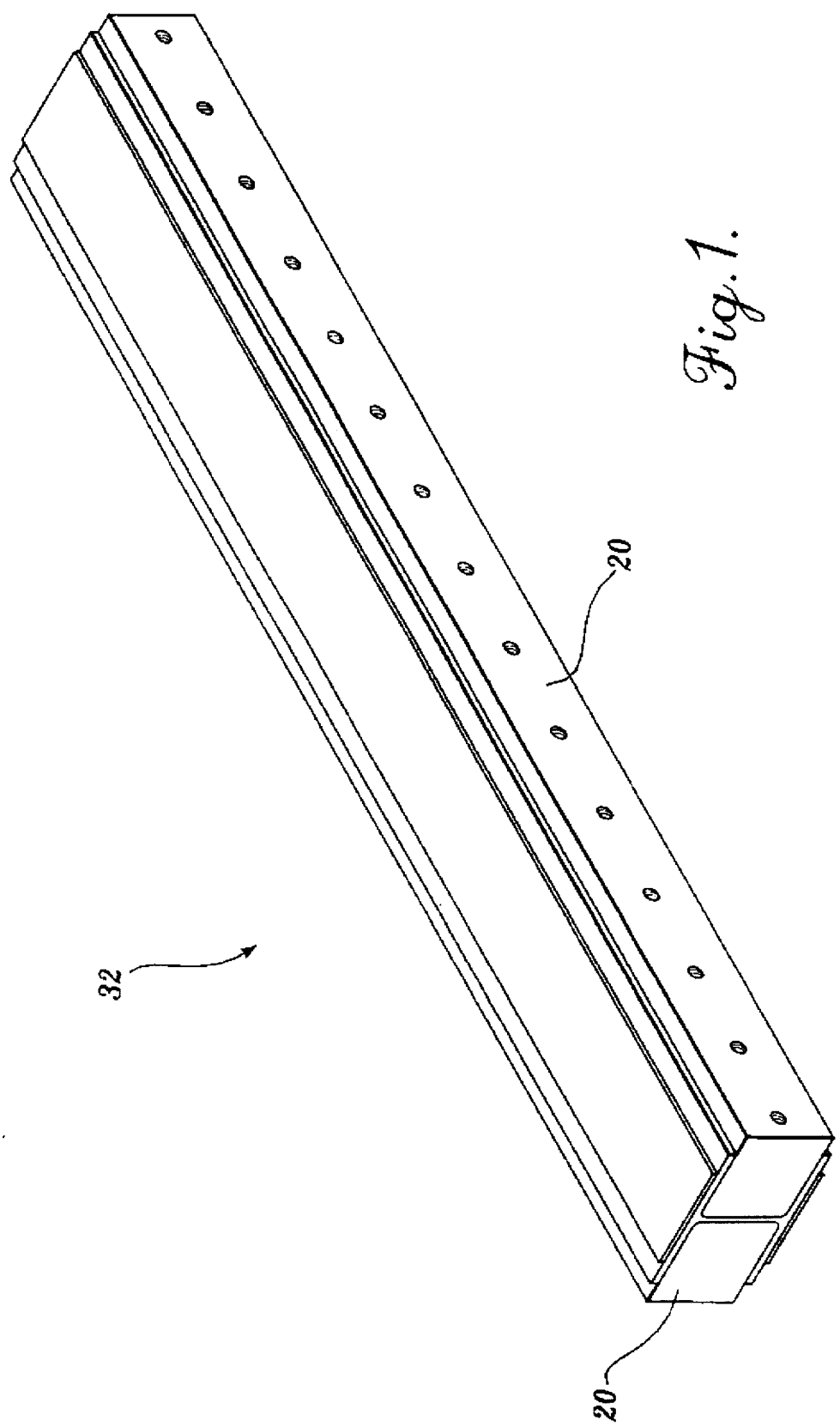

100

INSTRUCTIONS

① LOAD L/H'S ONTO TABLE, ROTATE ANVIL UP.

② LOCK ANVIL.

③ INFLATE SIDE BLADDER.

④ DEFLATE SIDE BLADDER.

⑤ UNLOCK ANVIL.

⑥ ROTATE ANVIL DOWN.

INSTALL NOODLE, CAP LAMINATE & CAUL PLATE.
    TAPE CAUL PLATE TO L/H.

⑦ ROTATE ANVIL UP.

⑧ LOCK ANVIL.

⑨ INFLATE SIDE BLADDER.

⑩ INFLATE TOP BLADDER.

⑪ DEFLATE SIDE & TOP BLADDER,
   (TOP BLADDER DEFLATE ALSO DEFLFATES SIDE BLADDER)

⑫ UNLOCK ANVIL.

⑬ ROTATE ANVIL DOWN.

⑭ ROTATE FLIPPER LEFT.

INSTALL NOODLE, CAP LAMINATE & CAUL PLATE.
    TAPE CAUL PLATE TO L/H.

⑮ ROTATE FLIPPER RIGHT.

REMOVE L/H'S FROM TABLE.

*Fig. 9B.*

COMPOSITE STRINGER ASSEMBLY MACHINE

FIELD OF THE INVENTION

The present invention relates to a machine for assembling a stringer, and more particularly to a machine for assembling a stringer made of a composite material.

BACKGROUND OF THE INVENTION

The use of composite materials in the manufacture of aircraft and other lightweight structures has increased steadily since the introduction of such materials. Composite materials have a high strength-to-weight ratio and stiffness, making them attractive in the design of lightweight structures. One drawback to using composite materials in the past has been high fabrication costs. It has been difficult to produce composite parts for the same cost as comparable metal parts. The cost differential is especially notable in large-scale parts or parts having abrupt or complex contours.

One of the largest contributors to composite structure costs is the amount of manual labor required during fabrication. Composite parts having abrupt or complex contours must be formed by manually laying up individual layers of composite material on a lay-up mandrel. Larger parts having more gradual contours, for example, large wing skins, may be fabricated using automated tape laying machines.

Automated tape laying machines have a robotic arm that places individual layers of composite prepreg on a mandrel to form a composite part. Automated tape laying machines can place individual layers of prepreg at a high rate, thus possibly reducing fabrication time and cost. The mechanics of the automated tape laying machine limits its ability to place layers of composite prepreg over some geometries. Automated tape laying machines generally cannot place composite prepreg around abrupt curvatures or tight radiuses of curvature.

A common composite support structure used in the construction of aircraft and other light-weight structures is the "I"-beam or "T"-stringer. Due to abrupt curvatures, I-beams, and other beam-type composite structures are generally formed by manually placing layers of composite material over a lay-up mandrel. An automated cutting machine is used to cut each layer of composite prepreg to the proper shape. The individual layers of prepreg are then placed on two separate lay-up mandrels by hand. Once properly positioned, each layer of prepreg is manually formed to the exterior contours of the lay-up mandrel to form two "C-channels."

The C-channels and lay-up mandrels are then rotated so that the C-channels can be joined together along their vertical webs to form an I-beam. After joining, a triangular composite radius filler is placed in the triangular recesses formed in the center of the top and bottom flanges during joining. Top and bottom composite reinforcement layers are then manually placed on the top and bottom of the I-beam. The resulting I-beam is then bagged and autoclave cured.

The entire I-beam fabrication process is labor intensive and time consuming. In addition to the labor required to place the composite material, labor is also required to manipulate the lay-up mandrels. Generally, lay-up mandrels are quite large and heavy, making them difficult and dangerous to maneuver. After the two C-channels are formed, a crane or similar handling device is used to engage the individual lay-up mandrels and transport them to an assembly table. The mandrels are then manually maneuvered, rotated, and aligned using levers, etc. The two channels are then bonded together using a vacuum membrane in a laborious, time-consuming process. Once bonded, a triangular radius filler is added to the top. The lay-up mandrels are then rotated 180° so that a triangular radius filler may be applied to the bottom of the I-beam. Finally, the resulting I-beam and lay-up mandrels must be placed on a curing mandrel for vacuum bagging and subsequent curing.

In addition to being costly, the extensive use of manual labor during the fabrication process produces quality control problems. Individual layers of composite prepreg are often incorrectly positioned. Extensive manual handling during fabrication also increases the likelihood of foreign materials being introduced into the completed part. Incorrectly placed layers of composite and foreign material are large contributors to overall part rejection rates.

Thus, a need exists for methods and apparatus that reduce the amount of manual labor required during the fabrication of structures, particularly large structures, from composite materials. The present invention is directed to meeting this need.

SUMMARY OF THE INVENTION

In accordance with the present invention, a machine suitable for use in assembling a stringer assembly from two C-shaped charges, each draped about a mandrel, is provided. The machine includes a framework, an elongate positioning and clamping mechanism, a rotating mechanism, and a controller for controlling the operation of the positioning and clamping mechanism and the rotating mechanism. The framework includes a pair of parallel platforms for supporting each C-shaped charge and the mandrel about which each C-shaped charge is draped. The positioning and clamping mechanism includes an elongate U-shaped anvil that is rotatably connected to the framework so as to be movable between engaged and disengaged positions. In the engaged position, the U-shaped anvil overlies the mandrels and C-shaped charges such that the side walls of the anvil lie on either side of the mandrels and C-shaped charges and the top overlies the mandrel and C-shaped charges. In the disengaged position, the U-shaped housing is located away from the mandrels and channel charges. Mounted in a U-shaped anvil are side and top bladders. The side bladder is located along one inside wall of the U-shaped anvil, and the top bladder is located along the inside of the top of the U-shaped anvil. When in the engaged position, the side and top bladders compact and align the C-shaped charges (which are back to back to one another). The C-shaped charges are compacted by the side bladder pressing the mandrels and the back to back C-shaped charges against the opposed wall of the U-shaped anvil. The C-shaped charges are aligned by the top bladder pressing the mandrels and the C-shaped charges against the platform. The rotating mechanism includes flipper members rotatably mounted to the framework. Each flipper member rotates about an axle connected to the framework, to move the mandrels and the channel charges from one platform to the other platform and in the process rotate the mandrels and the C-shaped charges 180 degrees.

In accordance with further aspects of this invention, the flipper members are rotated by a cam, rotatably connected to the framework, and a cam follower coupled to the flipper members that is driven by the cam.

In accordance with the other aspects of this invention, axial alignment devices are located at each end of the platform that receives the mandrels and C-shaped charges for aligning the ends of the mandrels and C-shaped charges prior to compaction.

The present invention allows composite lay-up mandrels and associated C-shaped charges to be easily manipulated during the fabrication process. The invention presses composite lay-up mandrels together to join two C-shaped charges and create a composite I-beam followed by rotating the mandrels and the composite I-beams so that fillers, cap charges, and caul plates can be added to both sides of the I-beam.

Use of the present invention reduces the amount of manual labor involved in the fabrication process. The invention may be used with equipment disclosed in copending patent applications to achieve further improvements in composite fabrication methods. In one of the other copending applications, a method and apparatus for vacuum forming flat composite charges into C-shaped charges by wrapping the charges around mandrels is disclosed. In another of the patent applications, an apparatus for moving mandrels and C-shaped charges to and from equipment of the type contemplated by this invention is disclosed. In yet another patent application, a method and apparatus for removing lay-up mandrels from a cured composite part is disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of a composite I-beam mounted on a pair of mandrels, assembled by a machine created in accordance with the invention;

FIGS. 9A and 9B comprise a diagram of the control panel of the machine of FIG. 3.

DETAILED DESCRIPTION OF THE PREFERRED EMBODIMENT

Figure 2A:
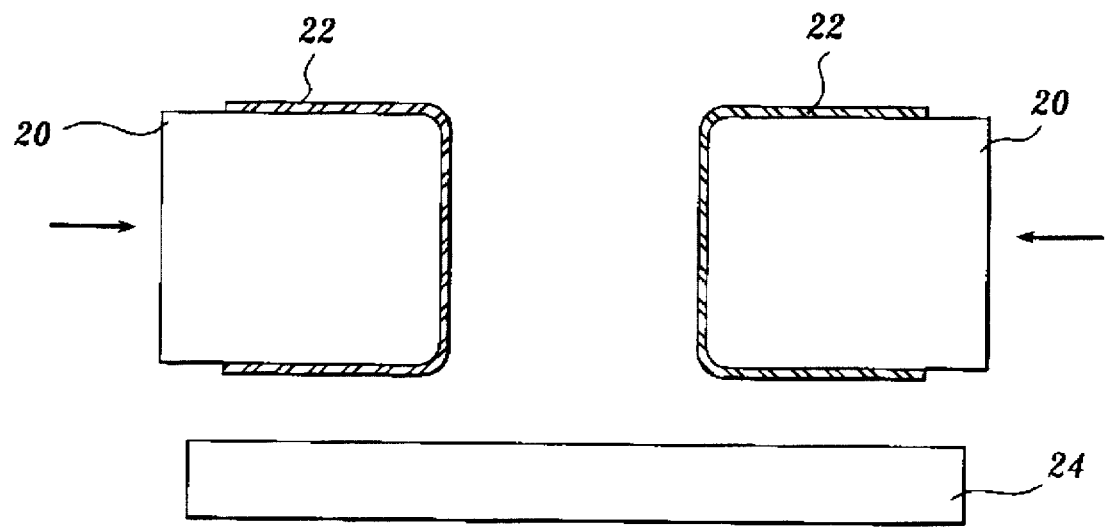
FIGS. 2A–2I are elevational views of the steps required to form the composite I-beam of FIG. 1.

Prior to describing the presently preferred embodiment of a composite stringer assembly machine formed in accordance with the invention, in order to better understand the machine, a brief description of the structure created by the machine and the steps required to create the structure are described. The structure is shown in FIG. 1 and comprises a composite I-beam affixed to a pair of mandrels. As noted below, after this structure is created, the mandrels are removed resulting in a composite I-beam suitable for use as a stringer in an airplane.

The typical procedure for creating a composite I-beam stringer is to: form a pair of C-shaped charges 22 about a pair of rectangular beams, known as lay-up mandrels 20; join the charges back to back; and add radius fillers 26, cap charges 28, and caul plates 30. The end result is a structure 32 of the type illustrated in FIG. 1. After forming, the structure is moved to an autoclave where the structure is heated to cure the epoxy included in the C-shaped charges, the fillers, and the cap charges. Thereafter the mandrels are removed. The machine of the present invention is used to assemble the structure prior to curing and removal of the mandrels. The steps required to create the assembly shown in FIG. 1 from a pair of mandrels having. C-shaped charges draped around the mandrels are shown in FIGS. 2A–2I and described next.

Figure 2B:
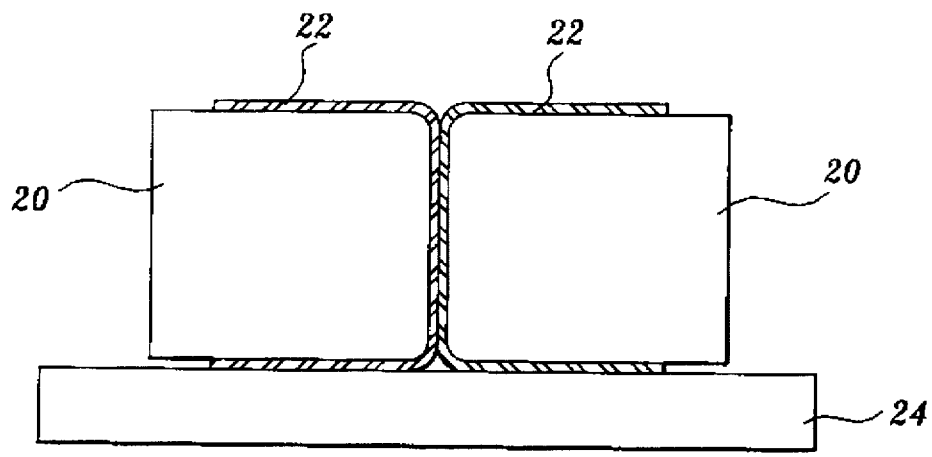
Figure 2C:
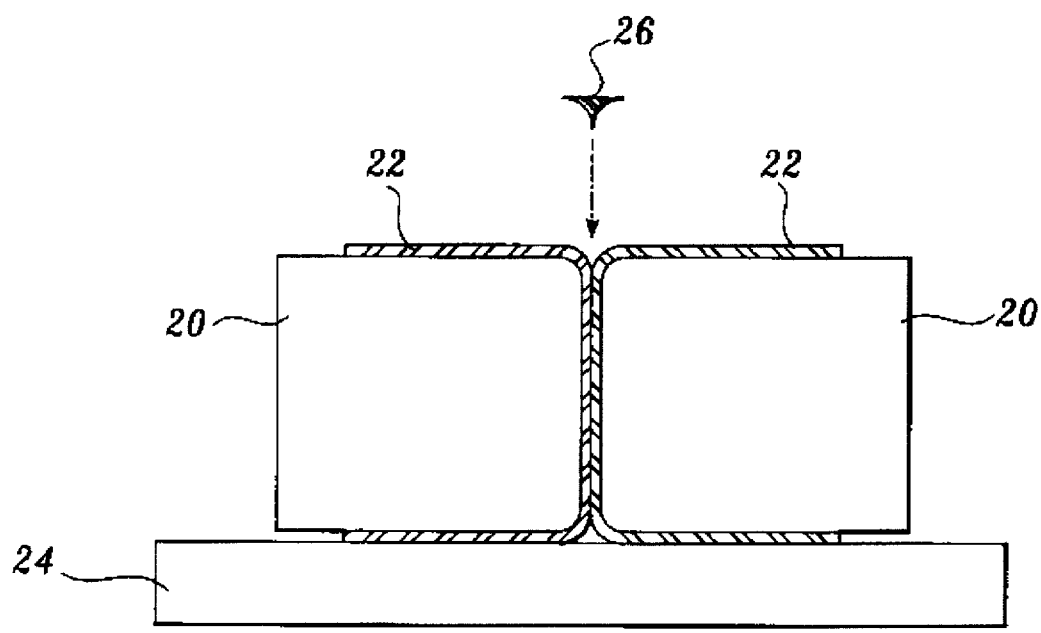

As illustrated in FIGS. 2A and 2B, after a draped channel charge 22 has been formed around each mandrel 20, the mandrels are compacted together on a surface 24. The mandrels are oriented such that the C-shaped charges lie back to back with respect to one another. In this position, usually a slight gap is present between the upper and lower portions along the juncture where the draped channel charges 22 meet. This gap is filled by a strip of composite material, known as a radius filler 26 or "noodle," having a triangular cross section. The radius filler is inserted along the upper juncture between the draped channel charges 22 as illustrated in FIG. 2C.

Figure 2D:
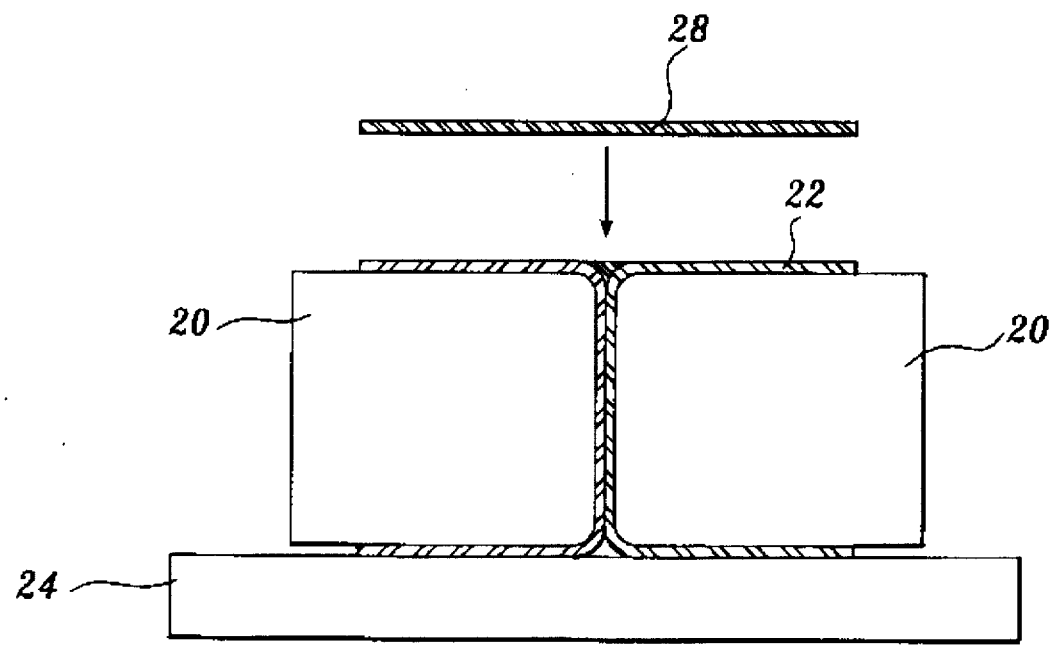
Figure 2E:
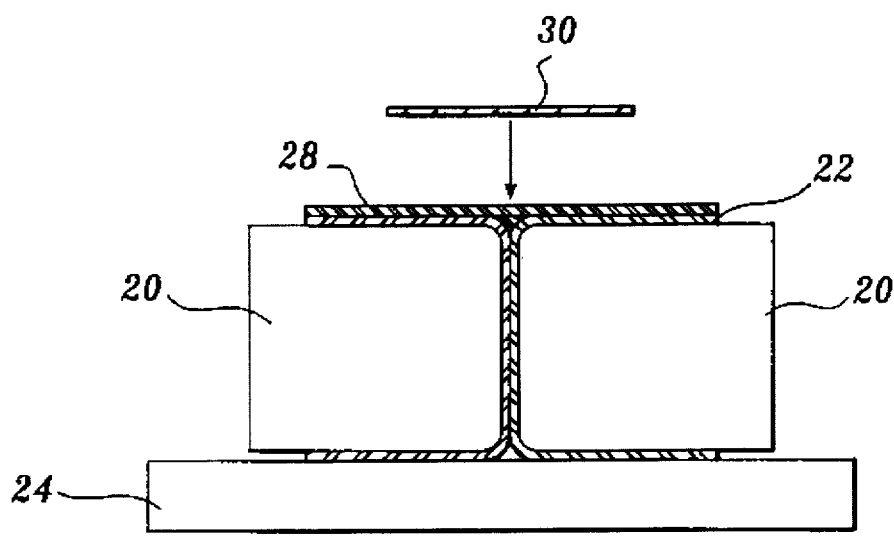

Once the radius filler 26 has been inserted between the upper edges of the draped channel charges 22, a rectangular-shaped sheet of composite material, known as a cap charge 28, is placed on top of the channel charges 22, over the radius filler 26 as shown in FIG. 2D. Finally, a rectangular-shaped sheet of metal, known as a caul plate 30, is placed over the cap charge 28 as illustrated in FIG. 2E.

Figure 2F:
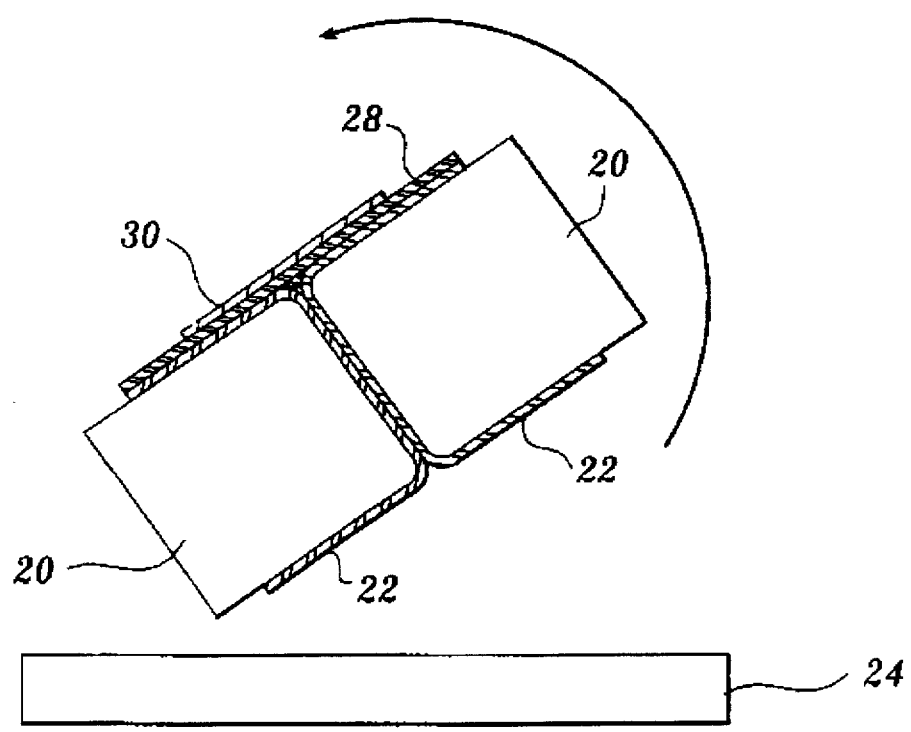
Figure 2G:
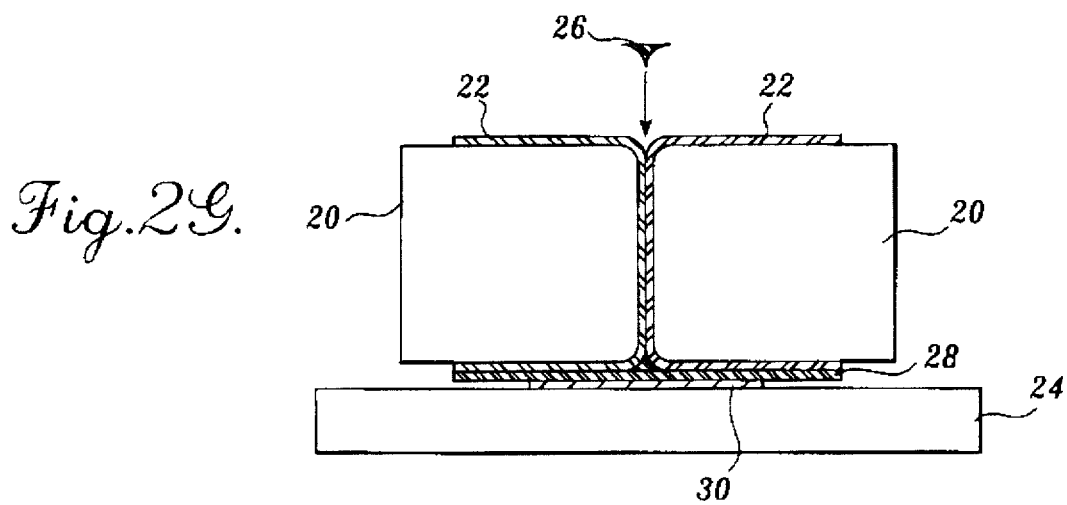
Figure 2H:
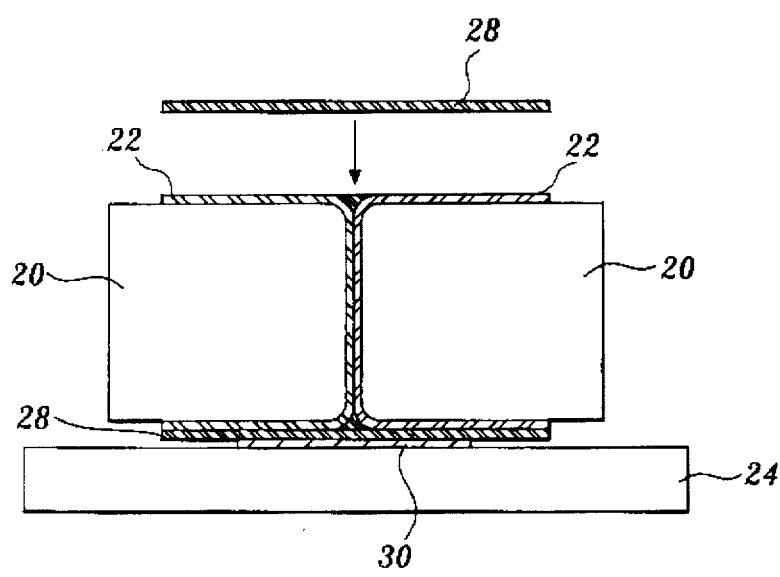
Figure 2I:
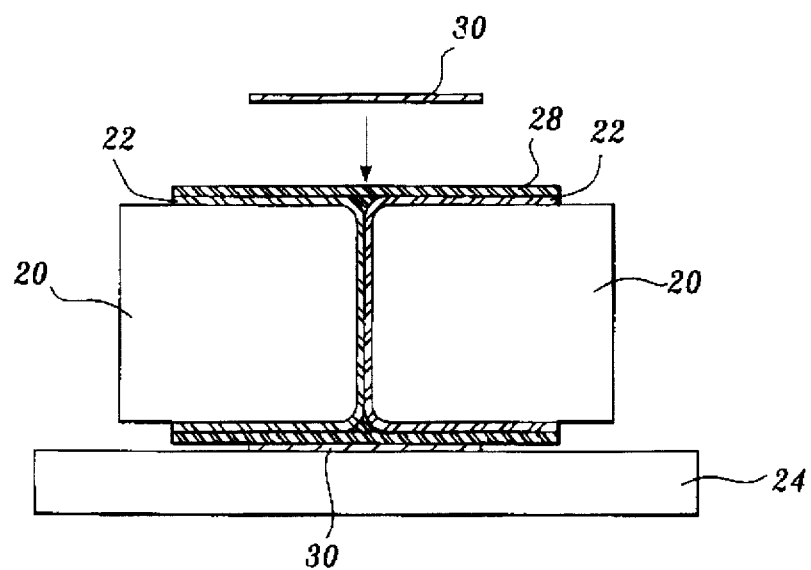

FIG. 2F illustrates the foregoing assembly being rotated 180 degrees along its longitudinal axis. The purpose of the rotation is so that a radius filler 26, cap charge 28, and caul plate 30 can be applied to the opposite side of the assembly. FIG. 2G shows a radius filler 26 being inserted into the remaining gap between the draped channel charges 22, after the assembly has been rotated. FIG. 2H illustrates a cap charge 28 being applied to the reverse side of the assembly. FIG. 2I shows a final caul plate 30 being applied to the assembly.

Once the foregoing steps have been performed, a completed stringer assembly, indicated generally by reference numeral 32 in FIG. 1, has been formed. As noted above, the completed assembly is processed further in an autoclave to cure epoxy contained in the composite materials. After curing, the mandrels 20 are removed at a disassembly station to complete the formation of an I-shaped stringer or beam for attachment to an aircraft skin panel.

In the past, the steps depicted in FIGS. 2A–2I and described above have been manually performed. Thus, they have been labor intensive. Mandrels up to approximately 40 feet in length, and weighing as much as 600 pounds, are used to manufacture some composite I-beams. Steel levers have been required to rotate such mandrels, often resulting in damage to the mandrels, the stringer assembly being formed, and/or injuries to personnel producing the stringer assembly. Further, in the past the compaction process has been time consuming because it has involved placing a membrane over the mandrels, sealing the membrane periphery to a table top, and applying a vacuum to the region between the membrane and the table to compact the mandrels together.

The present invention is directed to providing a composite stringer assembly machine for accomplishing some of the more labor intensive and potentially dangerous steps illustrated in FIGS. 2A–2I, in particular compacting and aligning the mandrels (FIGS. 2A and 2B) and rotating the mandrels (FIG. 2F). The other steps are performed by hand or by other equipment that does not form part of this invention.

Figure 3:
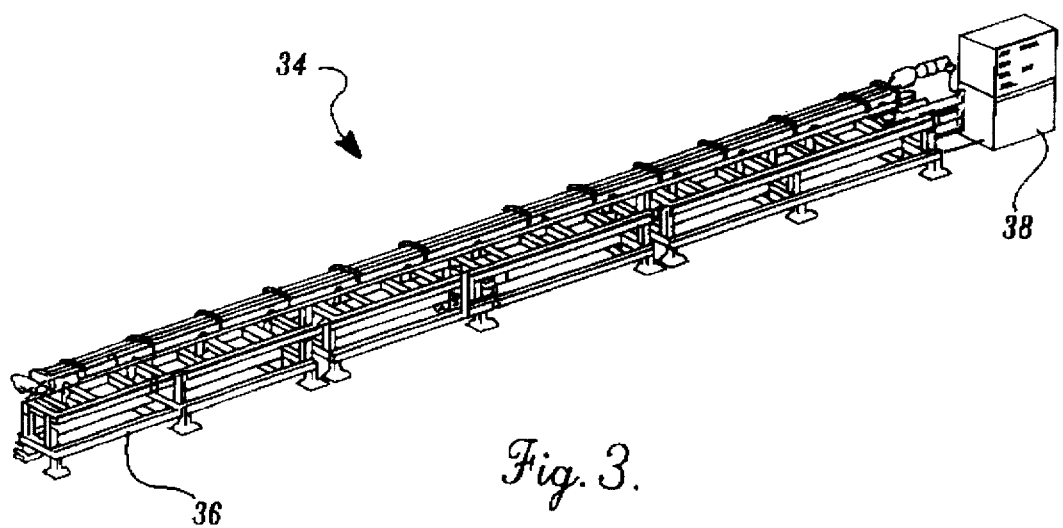
FIG. 3 is an overall perspective view of a composite stringer assembly machine formed in accordance with the present invention.

FIG. 3 depicts a composite stringer assembly machine, indicated generally by reference numeral 34, formed in accordance with the present invention. The composite stringer assembly machine 34 includes a framework 36 and a control console 38. The framework supports the mechanism for compacting and aligning a pair of mandrels 20 having C-shaped charges 22 draped about each mandrel and rotating the mandrels. The control console 38 houses the electronics that control the operation of these mechanisms.

Figure 4:
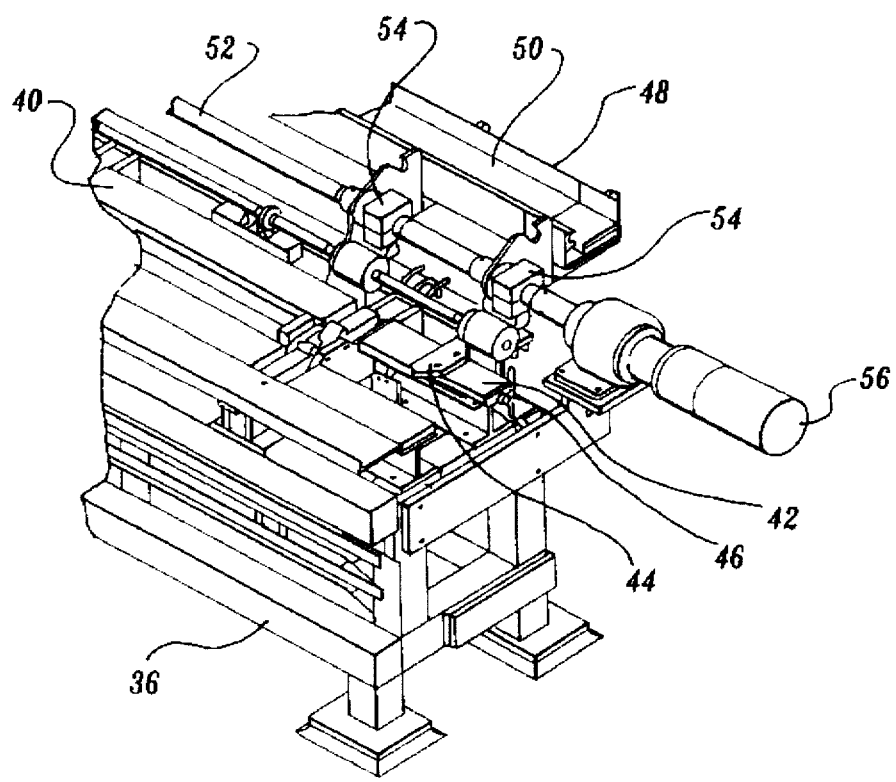
FIG. 4 is an enlarged perspective view of a portion of the machine of FIG. 3.

FIG. 4 is an enlarged view of the end of the framework of the composite stringer assembly machine 34 shown in FIG. 3, nearest the control station 38. For clarity of explanation, the control station 38 is not shown in FIG. 4. With continued reference to FIG. 4, the framework 36 includes a first platform 40 formed of a plurality of elongate sections for receiving the pair of mandrels 20, and C-shaped charges 22 from equipment that does not form part of this invention. The mandrels and C-shaped charges are placed lengthwise upon the first platform 40 such that the C-shaped charges lie back to back to one another.

Figure 6:
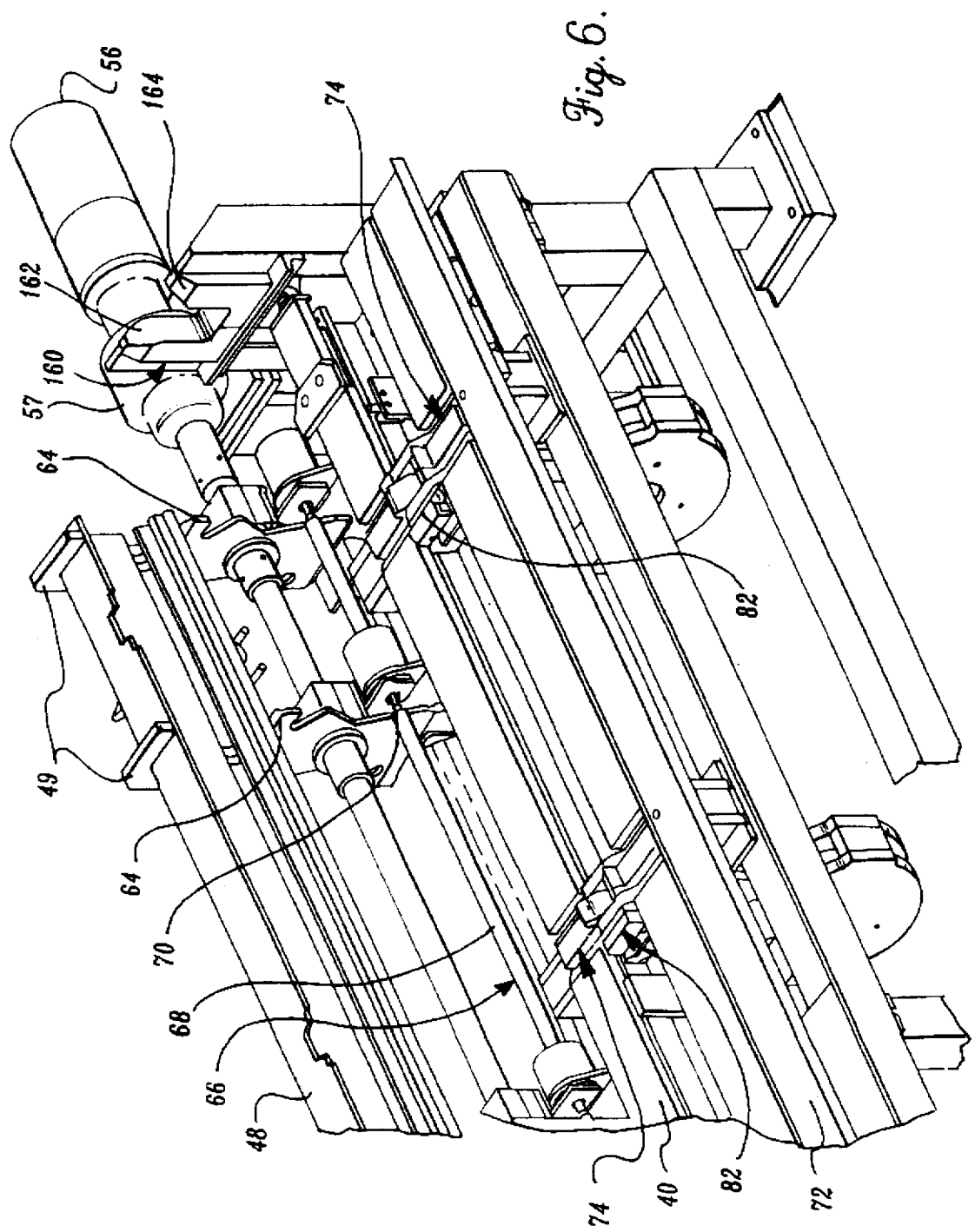
FIG. 6 is another enlarged perspective view of a portion of the machine of FIG. 3.

Referring to FIG. 6, guide yokes 160 are mounted to the framework 36, adjacent each longitudinal end of the first platform 40. The guide yokes 160 are used to aid in positioning a pair of mandrels 20, having a C-shaped charge 22 draped about each mandrel, on the first platform 40. The mandrels 20 are preferably suspended from an articulating arm assembly that includes a lead bar (not shown) suspended from a crane (not shown). The guide yokes 160 each include two upwardly directed arms 162 and 164. The arms are located on opposite sides of the longitudinal platform. When an articulating arm assembly is lowered, the lead bar is received between the arms 162 and 164 to align the mandrels 20 crosswise with the first platform 40.

Returning to FIG. 4, an axial alignment device 42 is slidably mounted to each end of the first platform 40, adjacent each guide yoke 160. Each alignment device 42 is used to precisely align the ends of the mandrels 20 with one another after the mandrels and the C-shaped charges have been placed upon the platform. Each alignment device 42 includes a pushing member or head 44 that faces the adjacent ends of the mandrels. The head 44 is driven against the ends of the mandrels 20, moving the closest mandrel, until the head evenly contacts the end of both mandrels. In this way the ends of the mandrels are aligned with one another. As a result, the C-shaped charges 22 draped around the mandrels are also aligned.

The head 44 of the alignment device 42 is moved by rotating a handle 46 attached to the end of the alignment device opposite the head 44. When the handle 46 is rotated in one direction, the head 44 is driven against the mandrels 20, and when the handle is rotated in the opposite direction, the head 44 is moved away from the mandrels. An ACME-screw mechanism (not shown), in a conventional arrangement known in the art, translates the rotational motion of the handle 46 into linear motion of the head 44. Additionally, the ACME-screw mechanism provides a mechanical advantage so that a user can easily rotate the handle 46 to move one of the relatively heavy mandrels 20 until the head generally evenly contacts both mandrels to align the ends of the mandrels. Preferably, the alignment device 42 is coupled to the platform 40 by a sliding mechanism that includes a channel in the shape of a dovetail (not shown) formed in the platform and a projecting dovetail (not shown) formed on the lower side of the alignment clamp. After the alignment device 42 has been used to align the ends of mandrels 20, preferably it is retracted out of the way.

The composite stringer assembly machine includes a positioning and clamping mechanism that includes a U-shaped anvil 48 that extends along one side of the platform 40. The U-shaped anvil 48 defines a generally rectangular-shaped channel, indicated generally by reference numeral 50. The U-shaped anvil 48 is mounted on a shaft 52 that is supported by the framework 36 and lies parallel to the first platform 40. More specifically, the shaft 52 is rotatably attached to the framework 36 by a plurality of mounts 54 that are affixed to the framework. The anvil 48 includes a plurality of U-shaped hinge plates 49 located along the length of the anvil. The hinge plates are affixed to the shaft 52. A motor 56 and gearbox 57 mounted on the framework 36 and coupled to one end of the shaft 52, rotates the shaft 52 to cause the anvil 48 to rotate from a disengaged position away from the mandrels 20 and C-shaped charges 22 (shown in FIG. 4), to a position overlying the mandrels and C-shaped charges. Preferably, the motor 56 is a conventional electric motor with a suitable gearbox. In one actual embodiment of the machine 34, the gearbox 57 included a planetary gear reducer with a 900:1 ratio. This reducer allowed a small one-horsepower motor to rotate the heavy anvil at a safe speed.

Figure 5A:
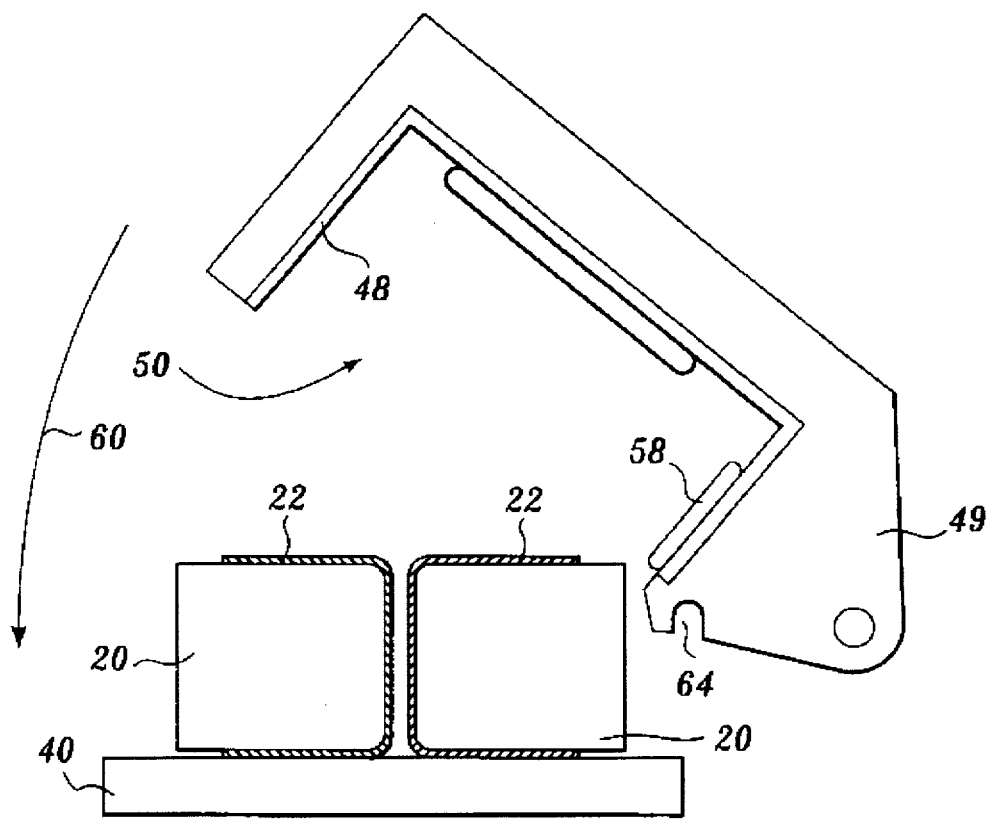
FIGS. 5A and 5B are schematic diagrams of the anvil or U-shaped housing of the machine of FIG. 1.

FIG. 5A is a schematic end view of the U-shaped anvil 48, and the two mandrels 20 and C-shaped charges 22 supported by the first platform 40. The remaining portions of machine 34 are not shown for clarity of illustration. The mandrels 20 and C-shaped charges 22 are arranged upon the first platform 40 such that the backs of the C-shaped charges 22 face one another.

Figure 5B:
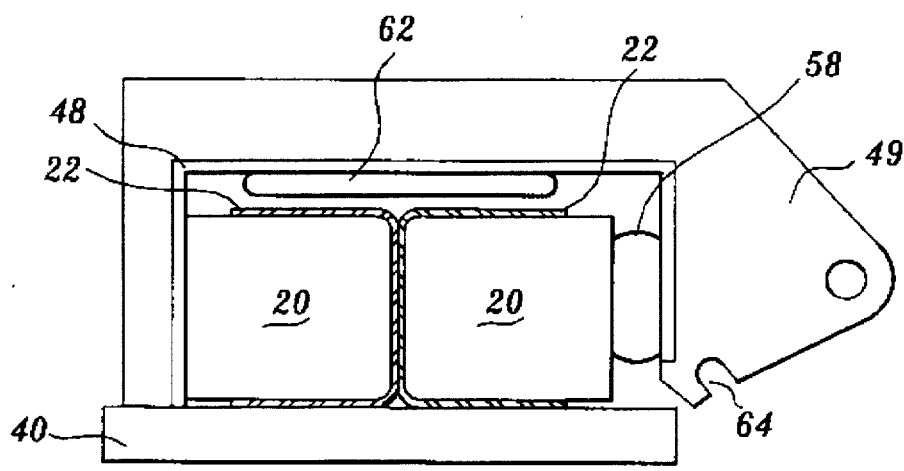

Mounted in the U-shaped anvil 48 is a side bladder 58. The side bladder is mounted internally to the side of channel 50 defined by the anvil 48 that is nearest to the shaft 52. The side bladder 58 runs the length of anvil 48, is made of rubber, and is inflatable. When the motor is suitably energized, the anvil 48 is rotated in the direction indicated by arrow 60 (FIG. 5A) from the disengaged position to the overlying position. When in the overlying position, the anvil channel 50, as shown in FIG. 5B, encloses both mandrels 20. After the anvil 48 is moved to the overlying or engaged position, the side bladder 58 is inflated to move the mandrels 20 toward one another and against the far wall of the anvil. This ensures that good contact and adhesion is made between the tacky C-shaped channel charges 22. In one actual embodiment of the invention, the side bladder 58 is inflated to a nominal pressure of 30 psig.

Also mounted in the channel 50 defined by the U-shaped anvil 48 is top bladder 62. The top bladder is mounted internally to the top of anvil 48, which lies orthogonal to the side to which first bladder 58 is mounted. The top bladder 62 runs the length of the anvil and is substantially identical to side bladder 58, except that it has approximately twice the width because it makes contact with both mandrels and C-shaped charges, rather than just one. When the anvil 48 is in the engaged position as illustrated in FIG. 5B, and preferably after the side bladder 58 has been inflated at least once to press the mandrels 20 and C-shaped 22 together and against the far wall of the anvil, the top bladder 62 is inflated.

The top bladder 62 presses the mandrels 20 and C-shaped charges against the platform 40 so as to align the mandrels 20 flush with one another. The first platform 40 is preferably made from a non-stick material to prevent adhering the channel charges 22 to the platform. In one actual embodiment of the invention, the top bladder 62 is inflated to a nominal pressure of 15 psig. In that embodiment, the top bladder 62 is inflated after the radius filler 26, cap charge 28, and caul plate 30 have been added to at least one side of the channel charges 22 shown in FIGS. 2C, 2D and 2E and described above. Thus, inflation of top bladder 62 also serves to press these items against the channel charges 22.

The motor 56 (see FIG. 4) includes a brake (not shown) which is applied when the anvil 48 is engaging the mandrels 20 and C-shaped charges 22 as shown in FIG. 5B. The brake stops the motor quickly, but the motor alone cannot resist the large rotational force caused by inflating the top bladder 62. Additionally, the hinge plates 49 of the anvil 48 include a C-shaped lock channel 64, as shown in FIGS. 5A, 5B and 6. When the anvil 48 is positioned to engage the two mandrels 20 (FIG. 5B), a locking rod 66 affixed to the framework 36 (FIG. 6) resides in the lock channels 64. The locking rod 66 includes a plurality of larger diameter portions 68, alternating with shorter, smaller diameter portions 70. When the anvil 48 is first rotated into the mandrel-engaging position, the smaller diameter portions 70 of the locking rod 66 are received by the lock channels 64. The anvil 48 is then locked into place, i.e., prevented from rotating, by sliding the locking rod 66 along its longitudinal axis, such that the larger diameter portions 68 are moved into the lock channels 64. The larger diameter portion 70 of the locking rod 66 is too large to fit through the openings into the C-shaped lock channels 64. Thus the anvil 48 is locked in place.

After the radius filler 26, cap charge 28, and caul plate 30 have been added to at least one side of the U-shaped charges 22 as illustrated in FIG. 2F and described above, the mandrels 20 and C-shaped charges 22 are rotated so that these items can be applied to the opposite side of the C-shaped charges. In order to accomplish this requirement, the composite stringer assembly machine 34 includes a second platform 72 (FIG. 6) that lies adjacent and generally parallel to the first platform 40. Like the first platform 40, the second platform 72 is formed of a plurality of elongate sections positioned end to end. The mandrels and C-shaped charges are rotated from the first platform 40 to the second platform 72 so that the radius filler 26, cap charge 28, and caul plate 30 can be added to the opposite side of the C-shaped charges 22.

A plurality of rotating mechanisms 74 (FIG. 6) are located along the length of the platforms 40 and 72, between the sections. The rotating mechanisms rotate the mandrels 20 and C-shaped charges from one platform to the other. A series of schematic elevational views of one of the rotating mechanisms 74 are shown in FIGS. 7A–7D. These views illustrate the operation of the rotating mechanism. The views are in a plane lying orthogonal to the longitudinal axes of the platforms 40 and 72.

Figure 7A:
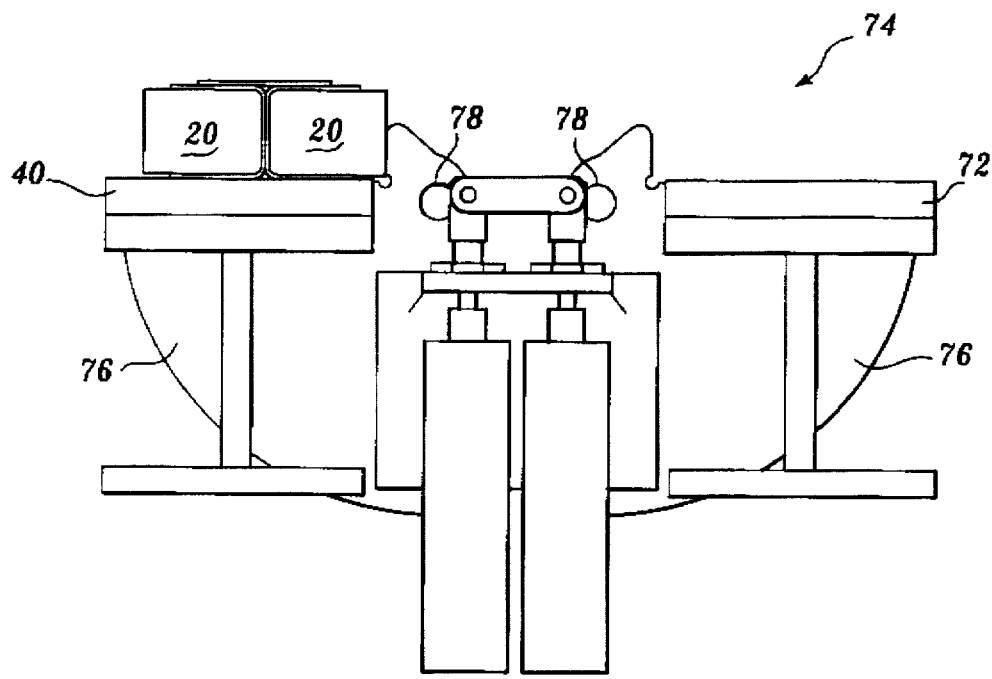
FIGS. 7A–7D are schematic end-view diagrams of the rotating mechanism of the machine of FIG. 1.

Each rotating mechanism 74 includes a pair of oppositely opposed flipper members 76 that are planar and generally in the shape of a quarter-circle. Prior to actuation, as shown in FIG. 7A, the flipper members are located underneath the platforms 40 and 72. More specifically, the plane in which the flippers lie is orthogonal to the longitudinal axis of the platforms 40 and 72. One edge of the quarter-circle flippers lies beneath the plane defined by the first and second platform 40 and 72. Further, one of the pairs of flippers lies beneath the first platform 40, and the second lies beneath the second platform 72. The flippers are rotatably mounted on axles 78 attached to the framework 36 (see FIG. 4), near the apex of their quarter-circle shapes. The axles run parallel to the platforms and lie at approximately the same elevation as the platforms. Two axles 78 are provided, one from the flippers associated with the first platform and the other for the flippers associated with the second platform.

Figure 7B:
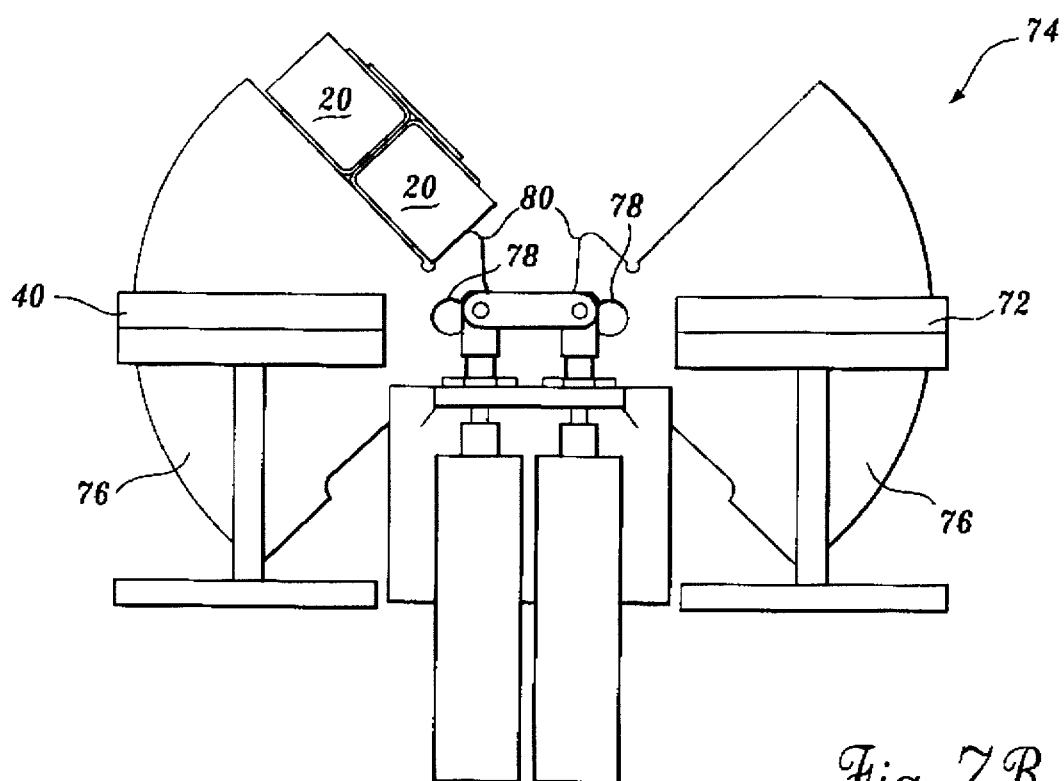

Each flipper member 76 rotates upwardly about its respective axle 78. One set of flipper members rotates counter-clockwise and the other rotates clockwise as shown in FIG. 7B. When the flippers are operated, the mandrels 20 and C-shaped charges 22, which are originally on the first platform 40, are lifted above the first platform 40 as the flipper members 20 rotate. The flipper members associated with the second platform also rotate even though they are not supporting anything. Thus, the edges of the flipper members that previously were below the first and second platforms move toward one another. A foot portion 80, near the apex of the circle shape of each flipper member 76, adjacent the inner edges of the platforms, serves to prevent the mandrels and C-shaped charges from sliding off the supporting flipper members as the flipper members rotate.

Figure 7C:
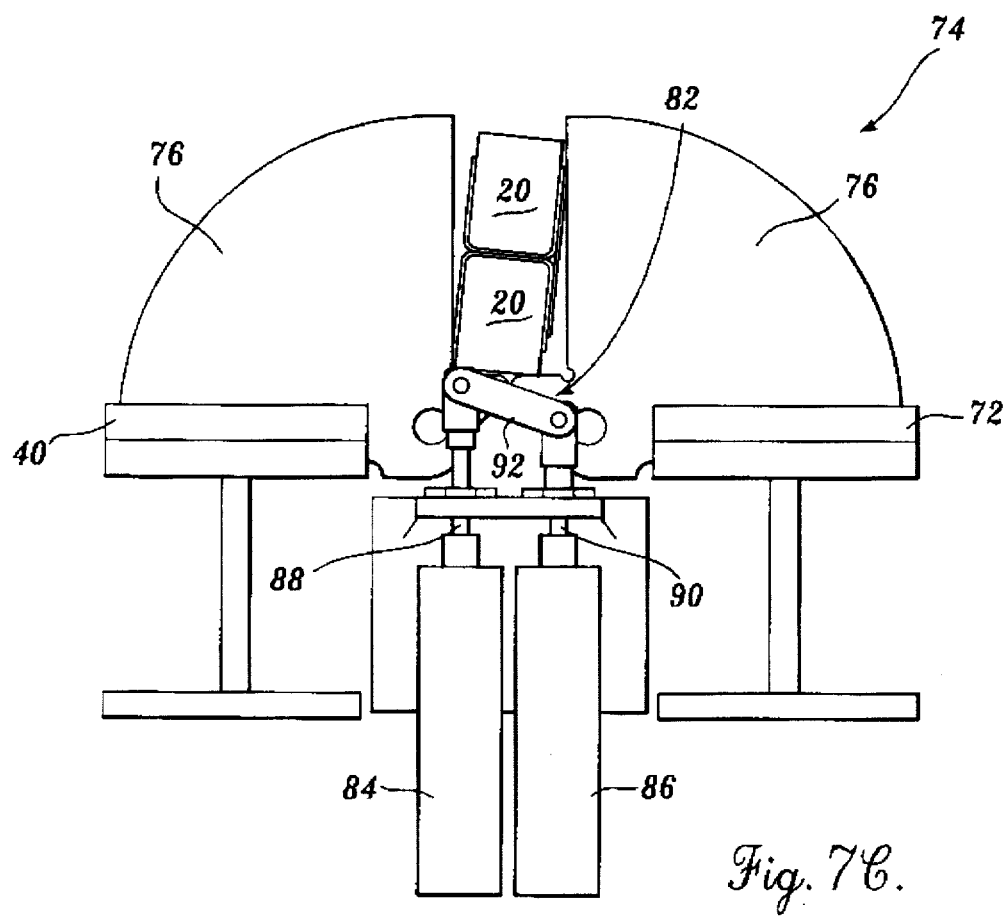

When the opposed flipper members 76 have rotated approximately ninety degrees to the position shown in FIG. 7C, a persuader mechanism 82 is operated. The persuader mechanism 82 causes the mandrels 20 and C-shaped charges 22 to "tilt" over and lean against the flipper members 76 associated with the second platform 72. In this way, the mandrels and C-shaped charges are "handed off" from the flipper members associated with the first platform to the flipper members associated with the second platform.

A persuader mechanism 82 is associated with each pair of flipper members. The persuader mechanisms 82 are located between platforms 40 and 72. See FIG. 6.

Each persuader mechanism comprises a pair of adjacent pneumatic cylinders 84 and 86, respectively having vertically oriented extension rods 88 and 90. A bridge member 92, which lies orthogonal to the longitudinal axes of, and between the platforms, pivotably interconnects the ends of the extension rods 88 and 90. When it is desired to tilt the mandrels 20 and C-shaped charges from the flipper members associated with the first platform 40 to the flipper members associated with the second platform 72, the pneumatic cylinder 84 nearest the first platform is energized to extend the rod 88 upward, causing the bridge member 92 to slope towards the second platform 72. As a result, the bridge member impinges on the corner of the vertical mandrels and C-shaped charges nearest to the first platforms. As this corner is raised, the mandrels and C-shaped charges tilt towards the second platform 72 as shown in FIG. 7C. (If the mandrels 20 and C-shaped charges were being transferred from the second platform 72 to the first platform 40, the pneumatic cylinder 86 nearest the second platform is energized after the mandrels and C-shaped charges are rotated to a vertical position.) As will be readily appreciated by those skilled in the art, actuators other than pneumatic actuators can be used to perform the functions of pneumatic cylinders 84 and 86. For example, electric or hydraulic actuators can be used.

Figure 7D:
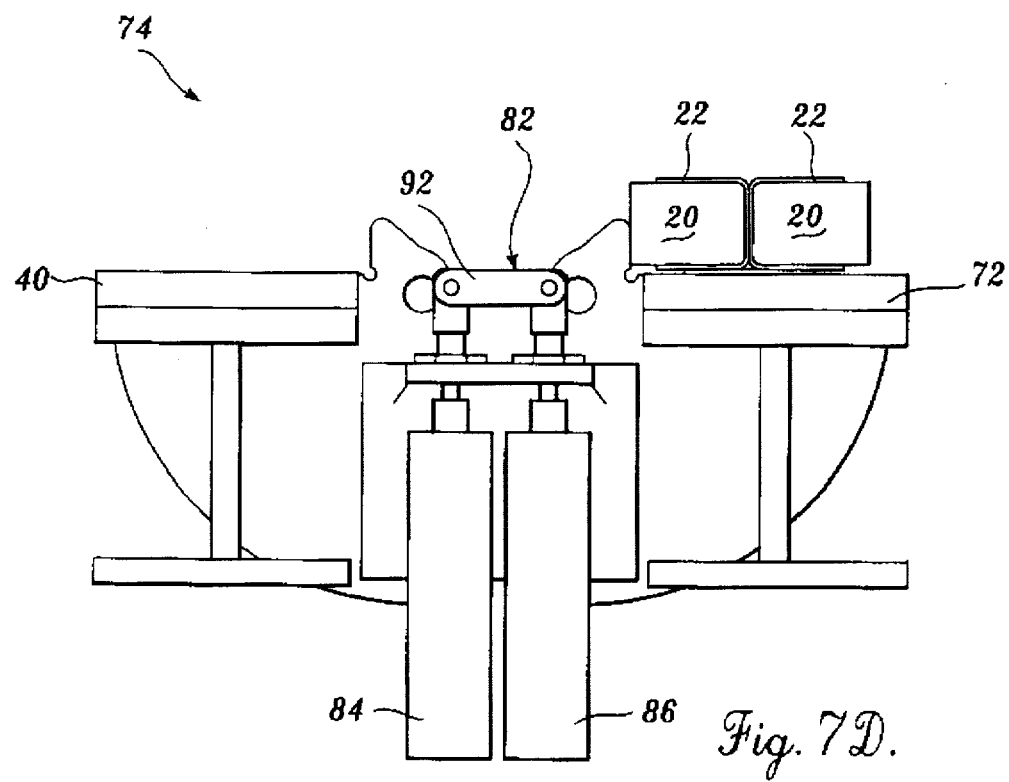

After the persuader mechanism 82 has been operated, the flipper members 76 are rotated downwardly to their original position as illustrated in FIG. 7D. Then the energized pneumatic cylinder 84 is de-energized causing its rod 88 to retract and the bridge member 92 of persuader mechanism 82 to resume a generally horizontal position. Since the mandrels 20 and C-shaped charges are leaning towards the second platform 72, as the flipper members 76 rotate down, the flipper members associated with the second platform 72 support the mandrels. Since the mandrels 20 and C-shaped charges have been rotated 180 degrees about their longitudinal axis during the just described actions, they end up in an inverted position on the second platform. Thus, a radius filler 26, cap charge 28, and caul plate 30 can now be added to the reverse side of the C-shaped charges 22.

Figure 8:
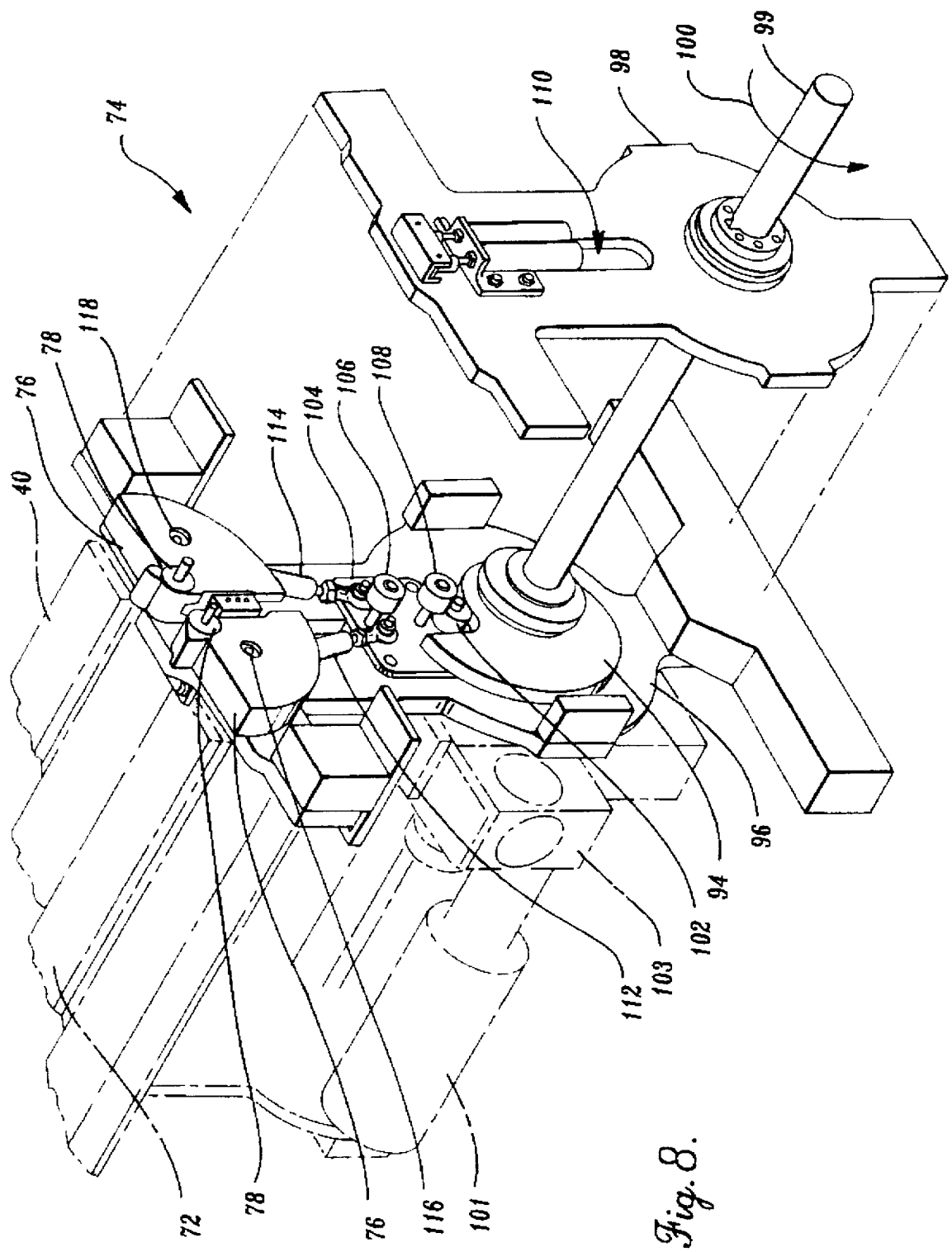
FIG. 8 is a partially exploded view of the rotating mechanism of the machine of FIG. 1.

A partially exploded view of an entire rotating mechanism 74 is illustrated in FIG. 8. The first and second platforms 40 and 72 and other elements that do not form part of the rotating mechanism 74 are shown in phantom. In addition to the flipper members 76, the rotating mechanism 74 includes a rotary cam 94 located between two generally parallel plates 96 and 98. The plate lies orthogonal to the longitudinal axes of the first and second platforms 40 and 72. The first plate 98 is shown exploded away from the second plate 96 so that the cam 94 is visible. The cams 94 of all of the rotating mechanisms are mounted on a common shaft 99 that passes through the centers of the cams. A motor 101 and gear housing 103, both indicated in phantom for clarity of illustration, rotate the shaft 99 in the direction indicated by arrow 100, which rotates the cams 94 in the same direction.

As each cam 94 rotates, it presses against a roller 102 attached to a cam follower plate 104. The action of cam 94 against roller 102 forces the roller to move upwardly. Since the roller is attached to the cam follower plate, the cam follower plate 104 is moved upwardly. The cam follower plate is constrained to move upwardly by a pair of guide rollers 106 and 108. The guide rollers 106 and 108 are affixed one above the other to the cam follower plate and project into a guide slot 110 on the first plate 98.

A pair of connecting rods 112 and 114 are rotatably connected to the cam follower plate 104 on one end, and rotatably connected to a flipper member 76 on the opposite end, one to each of a pair of flipper members. Each connecting rod 112 and 114 connects to a shaft 116 or 118 on one of the flipper members 76. As shown in FIG. 8, the shafts are positioned radially outwardly from the apex of the flipper members 76. Upward movement of the connecting rods 112 and 114 caused by movement of the cam follower plate 104 forces the flipper members 76 to rotate about their axles 78, which, as noted above, are located near the apex of the quarter-circle shape of the flipper members.

Cam 94 is a double profile cam. The first cam profile has a high mechanical advantage to break the adhesion force between the C-shaped charges 22 created by the top bladder 62 pressing the mandrels 20 and the C-shaped charges against the first platform 40. After the mandrels 20 and C-shaped charges 22 have lifted approximately one-half inch off the first platform 40, a second cam profile having a lower mechanical advantage lifts the stringer to an approximately vertical position (see FIG. 7C).

Figure 9A:
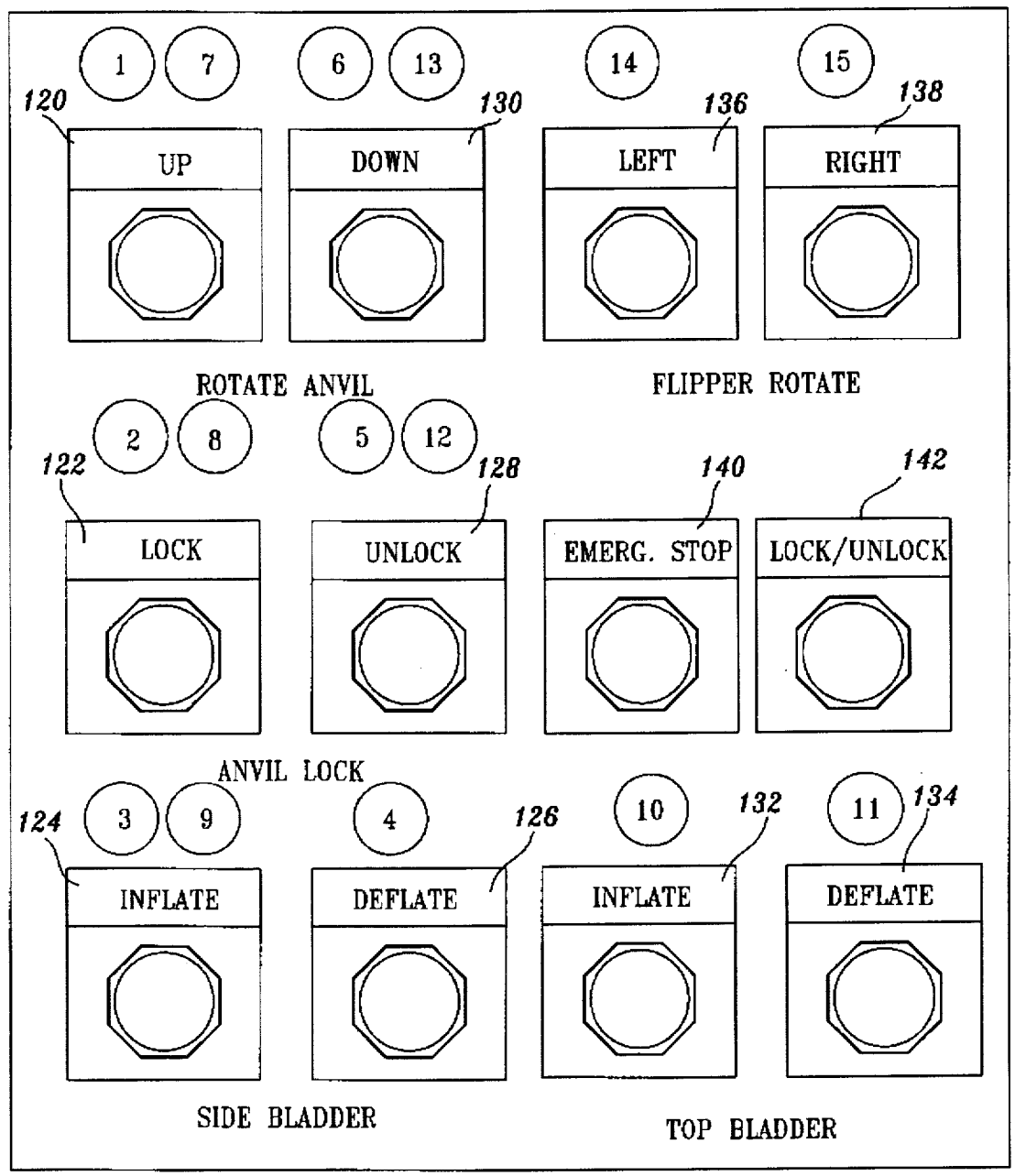

The operation of composite stringer assembly machine 34 is controlled by personnel pressing buttons on the control console (see FIG. 3). The buttons on the front panel of control console 38 are represented in FIG. 9A. As shown by an instruction box 100 in FIG. 9B, the buttons in FIG. 9A are numbered in the sequence in which they are preferably pressed when operating the composite stringer assembly machine. Some buttons are numbered more than once because these buttons are pressed more than once, as shown by the instruction box 100. After, a pair of mandrels 20 and C-shaped charges 22 have been placed on the first platform 40, and their ends aligned using the alignment device 42 in the manner described above, a first button 120 is pressed. Pressing the first button 120 energizes the motor 56, causing the anvil 48 to rotate over the mandrels and C-shaped charges (see FIG. 5B).

Next, a second button 122 is pressed. Pressing the second button 122 energizes an actuator that causes the locking rod 66 to move axially to lock the anvil 48 in the engaged position (see FIG. 6), as described above. Then a third button 124 is pressed. Pressing the third button causes a valve to close, allowing air to inflate the side bladder 58 located in the anvil 48. When this occurs, the mandrels 20 and C-shaped charges 22 are compacted together and pressed against the remote wall of the anvil 48, as described above. See FIG. 5B.

After the C-shaped charges 22 have been compacted together, a fourth button 126 is pressed. Pressing the fourth button causes the side bladder inflation valve to open, resulting in the side bladder 58 deflating. Then a fifth button 128 is pressed. Pressing the fitch button unlocks the anvil 48 by energizing an actuator that causes the locking rod 66 to slide axially away from the engaged position. Subsequently, a sixth button 130 is pressed. Pressing the sixth button energizes the motor 56, causing the anvil 48 to rotate away from the mandrels and C-shaped charges.

After the anvil 48 is rotated away from mandrels and C-shaped charges, personnel manually install the radius filler 26, the cap charge 28, and the caul plate 30 as described in connection with FIGS. 2C–2E. Then first, second, and third buttons 120–124 are then pressed again in sequence to move the anvil 48 over the mandrels 20 and C-shaped charges 22, lock the housing in place, and inflate side bladder 58 to compact the mandrels and C-shaped charges together and against the remote wall of the anvil. The mandrels and C-shaped charges are compacted together once again to ensure that the installation of the radius filler 26, the cap charge 28, and the caul plate 30 did not cause the C-shaped charges to separate.

Next, a seventh button 132 is pressed. When the seventh button is pressed, a valve that applies air to the top bladder is closed. As a result, the top bladder 62 is inflated. Inflation of the top bladder 62 presses the mandrels, C-shaped charges, filler cap charge, and caul plate against the platform 40, which helps to ensure that the C-shaped charges are horizontally aligned with one another. Inflation of the top bladder 62 also helps to press the radius filler 26, the cap charge 28, and the caul plate 30 firmly against the C-shaped charges 22. After the top bladder 62 has been inflated, an eighth button 134 is pressed, which opens the top bladder inflation valve and the side bladder inflation valve. As a result, both the top and side bladders 62 and 58 are deflated.

Subsequently, the fifth and sixth buttons 128 and 130 are pressed in sequence to unlock the anvil 48, and rotate the anvil to the disengaged position. Then a ninth button 136 is pressed. Pressing the seventh button energizes the motor 101 causing the flipper members 76 to rotate the mandrels 20 and C-shaped charges as shown in FIGS. 7A–7D, from the first platform 40 to the second platform 72. When the flipper members are fully extended, the cylinder 84 nearest the first platform 40 is energized to tilt the mandrels and C-shaped charges.

After the mandrels 20 and C-shaped charges 22 have been rotated to the second platform 72, a radius filler 26, cap charge 28, and caul plate 30 are applied to the reverse side of the C-shaped charges 22 to form a stringer assembly 32 of the type shown in FIG. 1. Then a tenth button 138 is pressed. Pressing the eighth button energizes the motor 101, causing the flipper members 76 to rotate the stringer assembly from the second platform 72 back to the first platform 40. When the upper members are in their fully extended position, the cylinder 86 closest to the second platform is energized to tilt the stringer assembly. Subsequently, stringer assembly 32 is removed from composite stringer assembly machine 34 and cured in an autoclave.

The control console 38 also includes an emergency stop button 140. Pressing the emergency stop button 140 causes all movement of the composite stringer assembly machine 34 to cease. Finally, the control console 38 includes a key switch 142, which is actuated by a key (not shown). The key switch 142 is used to lock the control console 38 so that it cannot be used.

Figure 10A:
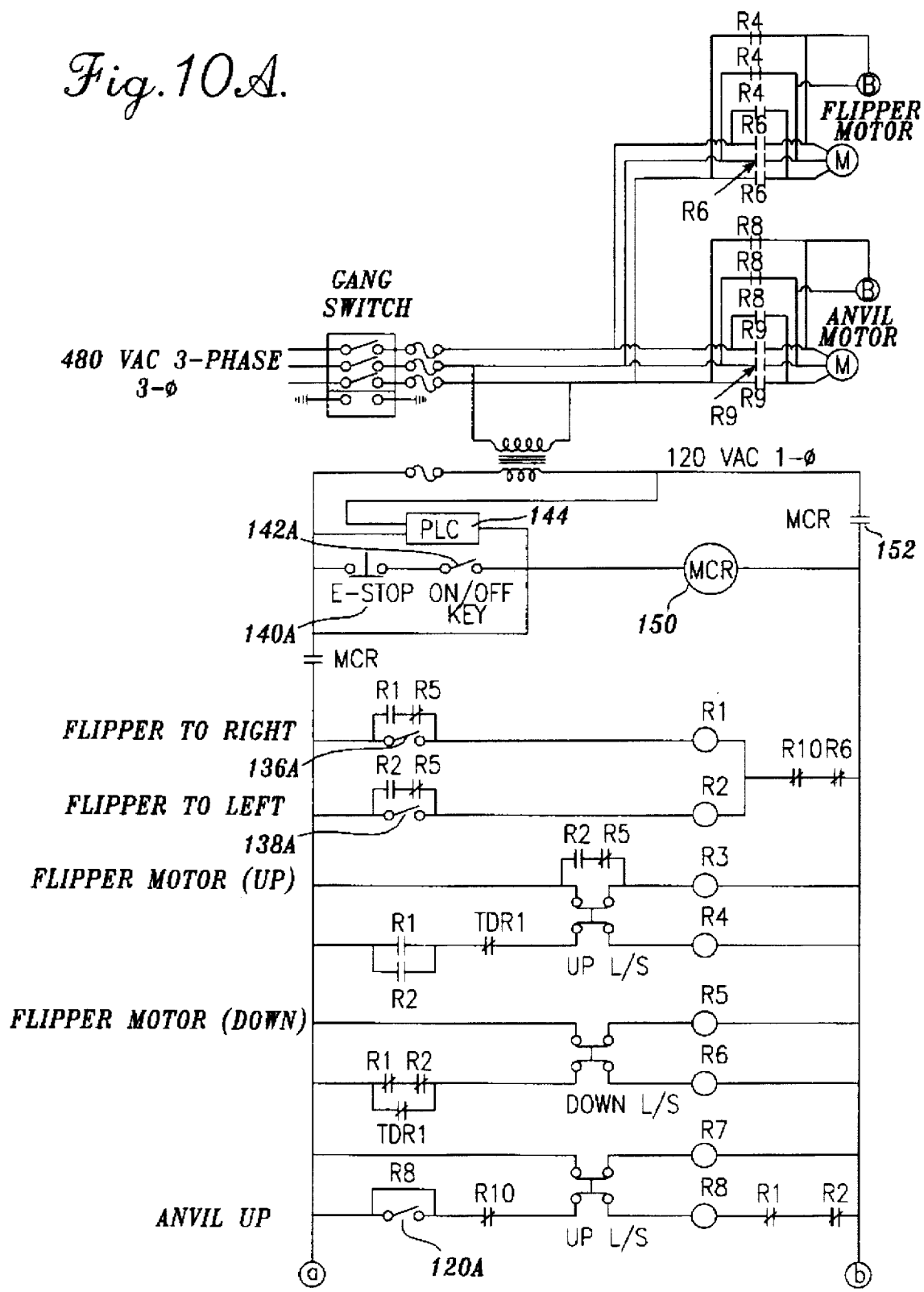
FIGS. 10A and 10B are a logic schematic of the controller of the machine of FIG. 3.
Figure 10B:
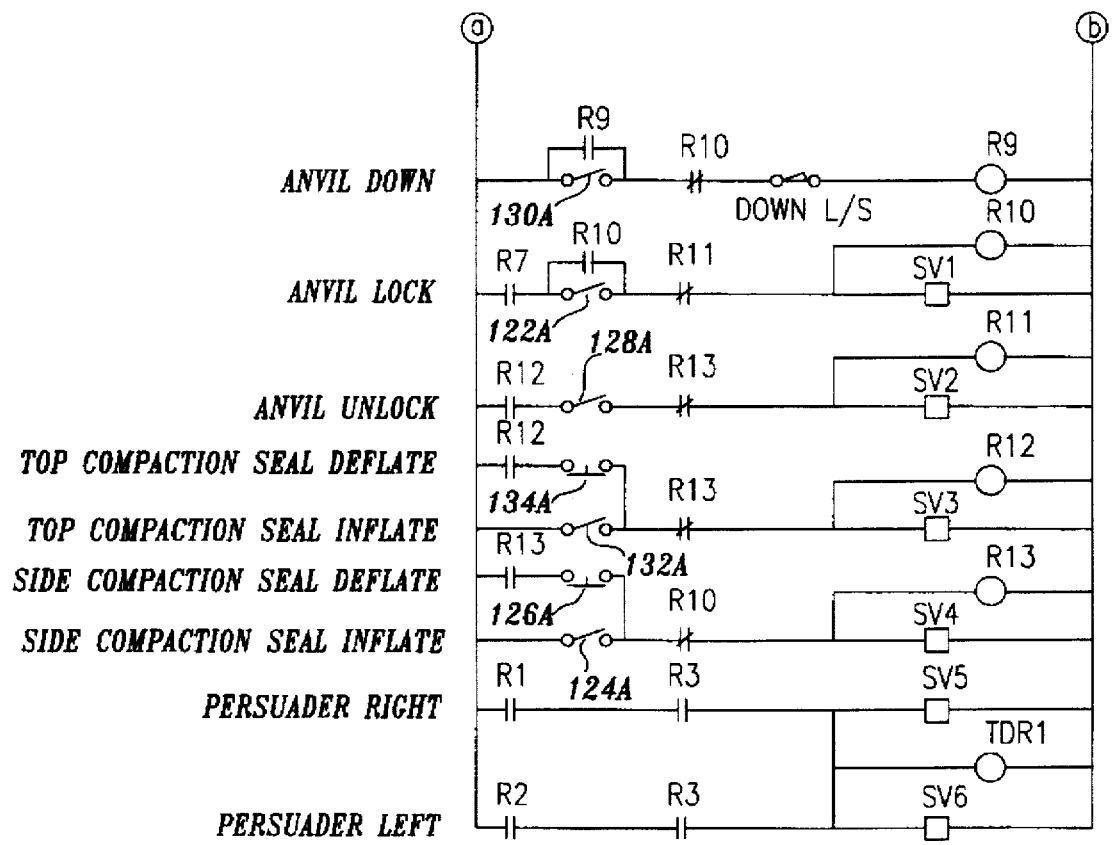

The control console 38 includes a programmable logic controller 144 illustrated in schematic form in FIGS. 10A and 10B that controls the operation of the composite stringer assembly machine 34 in response to button presses by operating personnel in the manner described above. Since the operation of control machines of the type shown in FIG. 10 will be readily apparent to those familiar with logic controllers, such operation is not described here. The switches operated by depressing the buttons shown in FIG. 9 and described above are identified by similar reference numbers with the addition of the letter "a." The elements controlled by the pressing of a button to close or open a switch are schematically illustrated as controlled by the contacts of relays, the coils of the relays being energized, or in some cases de-energized when a related switch is actuated by the pressing of a button.

As shown in FIG. 10, the key switch 142 and emergency stop button 140 control the application of power to a master control relay 150. If master control relay 150 is not energized, master relay contacts 152 remain open, preventing the application of power to the other relays and, thus, the operation of the composite stringer assembly machine 34.

The logic also includes some interlocks that prevent personnel from performing at least some functions out of order. For example, the side and top bladders 58 and 62 cannot be inflated unless anvil 48 has been locked in its mandrel and C-shaped charge overlying position. More particularly, if the third button 124 (switch 124a in FIG. 10) is pressed to inflate side bladder 58, the related relay R13 will not be energized unless contacts R10 are closed. Contacts R10 are controlled by relay coil R10, which is controlled by the anvil lock switch 122a. Relay coil R10 is energized when the anvil lock switch 122a is closed by pressing the second button 122. Relay coil R10 remains energized by the R10 latching contacts connected in parallel with the anvil lock switch 122a after the second button is released, provided relay coil R7 is energized and relay coil R11 is de-energized. Relay coil R7 is energized as long as the anvil is down and relay coil R11 is de-energized as long as the anvil is unlocked. Similar and other features of the logic will be readily apparent to those familiar with logic control machines of the type shown in FIG. 10.

While a preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A machine for use in forming an I-shaped composite stringer from two C-shaped channel charges, said machine comprising:

(a) frame;

(b) a first elongate platform mounted on said frame from supporting a pair of mandrels about which C-shaped charges have been draped, said mandrels being positioned such that said C-shaped charges lie back with respect to one another; and (c) a positioning a compacting mechanism mounted on said frame for positioning and compacting said C-shaped channel charges; and (d) a second elongated platform positioned adjacent said first elongate platform and a rotation mechanism for moving a pair of mandrels and C-shaped charges supported by said elongate platform from said elongate platform to said second elongate platform and in the process rotates said mandrels and said C-shaped charges through 180 degrees.

2. The machine claimed in claim 1, wherein said positioning and compacting mechanism includes:

(a) an elongate U-shaped anvil that defines a channel and a coupling mechanism rotatably coupling said anvil to said frame such that said anvil is movable between a disengaged position remote from said platform and an overlying position whereat said channel overlies said platform and a pair of mandrels and C-shaped charges supported by said platform; and (b) a first inflatable bladder mounted in said channel along one wall of said channel such that the inflation of said first inflatable bladder presses said pair of mandrels and C-shaped charges together and against a wall of said channel opposite to the wall on which said first inflatable bladder is mounted.

3. The machine claimed in claim 2 wherein said positioning and compacting mechanism includes a second bladder mounted in said channel on a wall of said channel that overlies said platform when said channel is in said position overlying said platform for creating a force that presses said mandrels and C-shaped charges toward said first platform.

4. The machine claimed in claim 3, wherein each of said platforms is segmented and wherein said rotation mechanism, includes: a plurality of pairs of flipper members located between the segments of said platforms, one flipper member of each said pairs of flipper members being located beneath said first elongate platform and the other flipper members of each of said pairs of flipper members being mounted between said segments of said second elongate platforms; and mounting means for mounting said flipper members such that said flipper members can be rotated upwardly about axes located adjacent the facing edges of said platforms.

5. The machine claimed in claim 4, wherein said flipper members are planar and circumscribe circuit segments and wherein said rotation mechanism also includes rotatable mounting means for rotatably mounting said circular segments at the apex of said segments.

6. The machine claimed in claim 5, wherein said rotation mechanism also includes a plurality of persuader elements, one of said persuader elements located between said flipper members.

7. The machine claimed in claim 6, wherein said rotation mechanism includes a cam-operated driving machine coupled to said flipper members for rotating said flipper members.

8. The machine claimed in claim 1, wherein each of said platforms is segmented and wherein said rotation mechanism includes: a plurality of pairs of flipper members located between the segments of said platforms, one flipper member of each of said pairs of flipper members being located beneath said first elongate platform and the other flipper member of each of said pairs of flipper members being mounted between said segments of said second elongate platform; and mounting means for mounting said flipper member such that said flipper members can be rotated upwardly about axes located adjacent the facing edges of the platform.

9. The machine claimed in claim 8, wherein said flipper members are planar and circumscribe circular segments and wherein said rotation mechanism also includes rotatable mounting means for rotatably mounting said circular segments at the apex of said segments.

10. The machine claimed in claim 9, wherein said rotation mechanism also includes a plurality of persuader elements, one of said persuader elements located between said flipper members.

11. The machine claimed in claim 10, wherein said rotation mechanism includes a cam-operated driving machine coupled to said flipper members for rotating said flipper members.

12. The machine claimed in claim 1, wherein the C-shaped charges are each draped about a mandrel, wherein each mandrel is suspended from a load bar when being placed on the platform, and said platform includes opposite longitudinal ends, the machine further comprising a guide yoke mounted to said frame, adjacent each longitudinal end of said platform, said guide yokes each including a pair of upwardly projecting arms for receiving the loading bar and aligning the mandrels having the C-shaped charges upon said platform.

* * * * *

UNITED STATES PATENT AND TRADEMARK OFFICE
CERTIFICATE OF CORRECTION

PATENT NO. : 5,538,589         Page 1 of 2
DATED : July 23, 1996
INVENTOR(S) : D.A. Jensen et al.

It is certified that error appears in the above-indentified patent and that said Letters Patent is hereby corrected as shown below:

| COLUMN | LINE | |
|---|---|---|
| [75] Pg. 1, col. 1 | Inventors | Delete "Joel M. Thomas, Kent, Wash." |
| 11 (Claim 1, | 64 line 4) | "(a) frame;" should read --(a) a frame;-- |
| 11 (Claim 1, | 65 line 5) | "frame from" should read --frame for-- |
| 12 (Claim 1, | 1 line 8) | "lie back" should read --lie back to back-- |
| 12 (Claim 1, | 3 line 10) | "positioning a compacting" should read --positioning and compacting-- |
| 12 (Claim 1, | 6 line 13) | "elongated" should read --elongate-- |
| 12 (Claim 4, | 36 line 3) | After "mechanism" delete --,-- |
| 12 (Claim 4, | 38 line 5) | "each said" should read --each of said-- |

UNITED STATES PATENT AND TRADEMARK OFFICE
CERTIFICATE OF CORRECTION

PATENT NO. : 5,538,589
DATED : July 23, 1996
INVENTOR(S) : D.A. Jensen et al.

It is certified that error appears in the above-indentified patent and that said Letters Patent is hereby corrected as shown below:

| COLUMN | LINE | |
|---|---|---|
| 12 (Claim 4, | 42 line 9) | "platforms;" should read --platform;-- |
| 12 (Claim 5, | 47 line 2) | "circuit" should read --circular-- |

Signed and Sealed this

Third Day of December, 1996

Attest:

BRUCE LEHMAN

Attesting Officer           Commissioner of Patents and Trademarks